(12) United States Patent
Minard et al.

(10) Patent No.: US 8,272,317 B2
(45) Date of Patent: Sep. 25, 2012

(54) HOUSING WITH INTEGRATED WATER LINE

(75) Inventors: James J. Minard, South Beloit, IL (US); Mark E. Bush, Rockton, IL (US)

(73) Assignee: Carrier Commercial Refrigeration, Inc., Charlotte, NC (US)

( * ) Notice: Subject to any disclaimer, the term of this patent is extended or adjusted under 35 U.S.C. 154(b) by 1055 days.

(21) Appl. No.: 12/094,284

(22) PCT Filed: Dec. 12, 2005

(86) PCT No.: PCT/US2005/045020
§ 371 (c)(1),
(2), (4) Date: Sep. 5, 2008

(87) PCT Pub. No.: WO2007/070028
PCT Pub. Date: Jun. 21, 2007

(65) Prior Publication Data
US 2009/0178570 A1    Jul. 16, 2009

(51) Int. Cl.
*A47J 31/44* (2006.01)
*F01B 23/08* (2006.01)

(52) U.S. Cl. ............. 99/279; 99/289 R; 99/280; 99/281; 99/282; 99/283; 99/495; 99/300; 99/287; 99/288; 99/290; 99/303; 99/323; 99/323.3; 99/275; 99/304

(58) Field of Classification Search ............ 99/279–283, 99/495, 287–304, 323, 323.3, 275; 417/321
See application file for complete search history.

(56) References Cited

U.S. PATENT DOCUMENTS

| 5,021,219 | A | 6/1991 | Rudick et al. |
| 5,309,820 | A | 5/1994 | Baxter et al. |
| 5,957,040 | A | 9/1999 | Feola |
| 6,698,228 | B2 * | 3/2004 | Kateman et al. ................ 62/346 |
| 2002/0194999 | A1 * | 12/2002 | Ervin .............................. 99/275 |

FOREIGN PATENT DOCUMENTS

| EP | 0295123 | 12/1988 |
| EP | 0471423 | 2/1992 |

OTHER PUBLICATIONS

International Preliminary Report on Patentability dated Jun. 26, 2008.
Search Report PCT/US05/45020.

* cited by examiner

*Primary Examiner* — Shawntina Fuqua
(74) *Attorney, Agent, or Firm* — Carlson, Gaskey & Olds, PC

(57) ABSTRACT

A beverage system includes a pump that draws a set amount of a flavored concentrate into a mixing chamber (28) for mixing with water to form a beverage. A pump head (46) includes a piston opening that receives a piston (48) and a water port that defines a water flow path. A housing (62) includes an integral water port (40). Water from a water source flows along a water line and into the integral water port (40) of the housing (62). The water flows through the water port (40) of the pump head (46) and into the mixing chamber (28) to form the beverage.

19 Claims, 7 Drawing Sheets

HOUSING WITH INTEGRATED WATER LINE

BACKGROUND OF THE INVENTION

The present invention relates generally to a pump employed in a beverage system including a housing that attaches a motor to an assembly plate that includes an integrated water port, and a water conduit is attached to the integrated water port to supply water to a mixing chamber to mix with a flavored concentrate form a beverage.

Beverages systems are employed to make beverages. A flavored concentrate and water are mixed to form the beverage. Typically, the flavored concentrate is stored in a concentrate container. A piston of a pump nutates within a pump head to draw a set amount of the flavored concentrate into a mixing chamber. Water is mixed with the flavored concentrate in the mixing chamber to form the beverage with a desired concentration.

In prior pumps that make beverages, the flavored concentrate is pumped into the mixing chamber with a pump, and water is separately pumped in the mixing chamber with a separate pump. An external connection feature is used to connect a water conduit to the mixing chamber. The connection feature is complex and requires a lot of space. Water from a water source directly flows into the mixing chamber for mixing with the flavored concentrate to form the beverage. A valve controls the flow of water into the mixing chamber to provide the beverage with the proper concentration. A drawback to prior pumps is that the pumps are large and that the external connection feature is bulky.

Hence, there is a need in the art for a pump employed in a beverage system including a housing that attaches a motor to an assembly plate that includes an integrated water port, and a water conduit is attached to the integrated water port to supply water to a mixing chamber to mix with a flavored concentrate to form a beverage and that overcomes the drawbacks and shortcomings of the prior art.

SUMMARY OF THE INVENTION

A beverage system makes beverages, soft drinks, milkshakes, dairy products, other frozen desserts or any mixed product. A pump draws a set amount of a flavored concentrate into a mixing chamber. The flavored concentrate and water combine in the mixing chamber to form the beverage.

A piston of a pump nutates within a pump head to draw the set amount of the flavored concentrate into the mixing chamber. The pump includes an adapter plate that aligns the piston and a housing of a motor. A locking ring attaches the adapter plate to the pump head.

The pump head includes a piston opening that receives the piston and a water port that defines a portion of a water flow path. The housing includes an integral water port. A water conduit transfers water from a water source directly into the integral water port of the housing. The end of the water conduit includes a fitting that fits over the water port of the housing. The water flows into a water chamber in the housing, into the water port of the pump head, along the water flow path and into the mixing chamber for mixing with the concentrate to form the beverage. A valve controls the flow of water along the water conduit. The water conduit is removably connected to the integral water port of the housing, and external connections are not needed.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
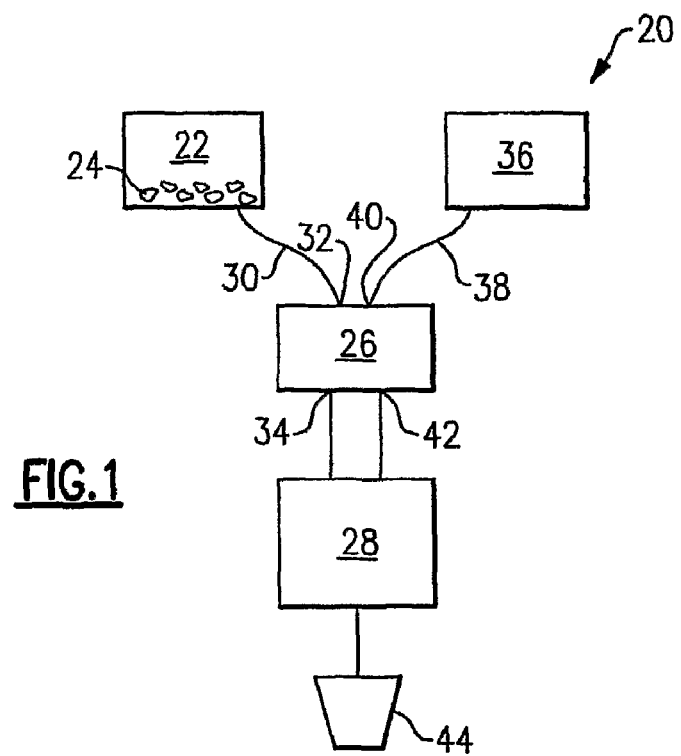
FIG. 1 schematically illustrates a beverage system used to make a beverage.

FIG. 1 schematically illustrates a beverage system 20 of the present invention. The beverage system 20 can be used to make beverages, soft drinks, milkshakes, dairy products, juices, other frozen desserts or any mixed product. The beverage system 20 includes a concentrate container 22 that contains a flavored concentrate 24 or syrup. In one example, the concentrate container 22 is a sealed bag that is cooled by a refrigeration system (not shown).

A pump 26 draws a set amount of the flavored concentrate 24 from the concentrate container 22 and into a mixing chamber 28. The flavored concentrate 24 from the concentrate container 22 flows along a conduit 30 and into a concentrate inlet 32 of the pump 26. The pump 26 controls the flow and the amount of the flavored concentrate 24 that is dispensed by the pump 26 through a concentrate outlet 34 and into the mixing chamber 28. Chilled water from a water source 36 cooled by a refrigeration system (not shown) flows along a conduit 38 and enters the pump 26 through a water port 40. In one example, the conduit 38 is made of copper. The pump 26 controls the flow of water through a water outlet 42 and into the mixing chamber 28. All the conduit 30 and 38 to the inlets 32 and 40, respectively, of the mixing chamber 28 are insulated.

The flavored concentrate 24 and the water are thoroughly mixed in the mixing chamber 28 to create the beverage having a desired concentration. The mixing chamber 28 is insulated to keep the mixed beverage cold. In one example, the concentration of water to flavored concentrate 24 is approximately 10:1 through 2:1. The beverage is then dispensed from the mixing chamber 28 into a cup 44 for serving.

Figure 3:
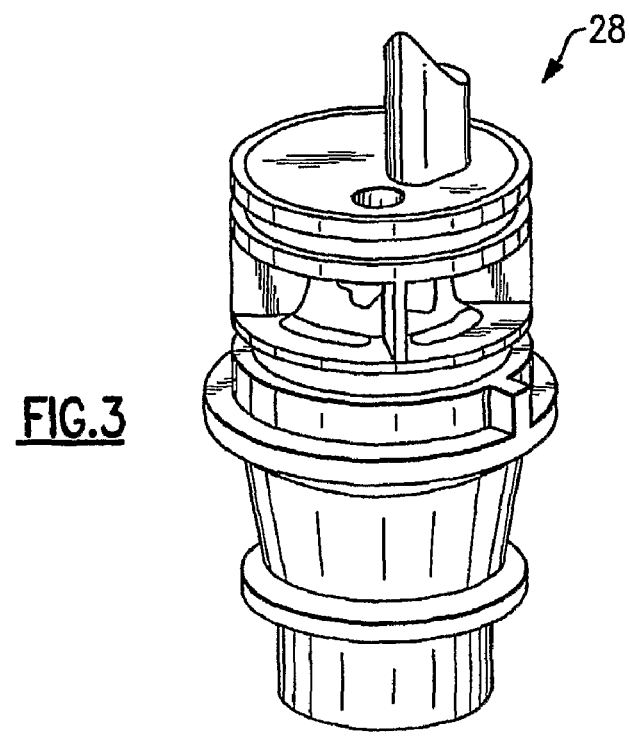
FIG. 3 schematically illustrates a perspective view of a mixing chamber of the pump.
Figure 2:
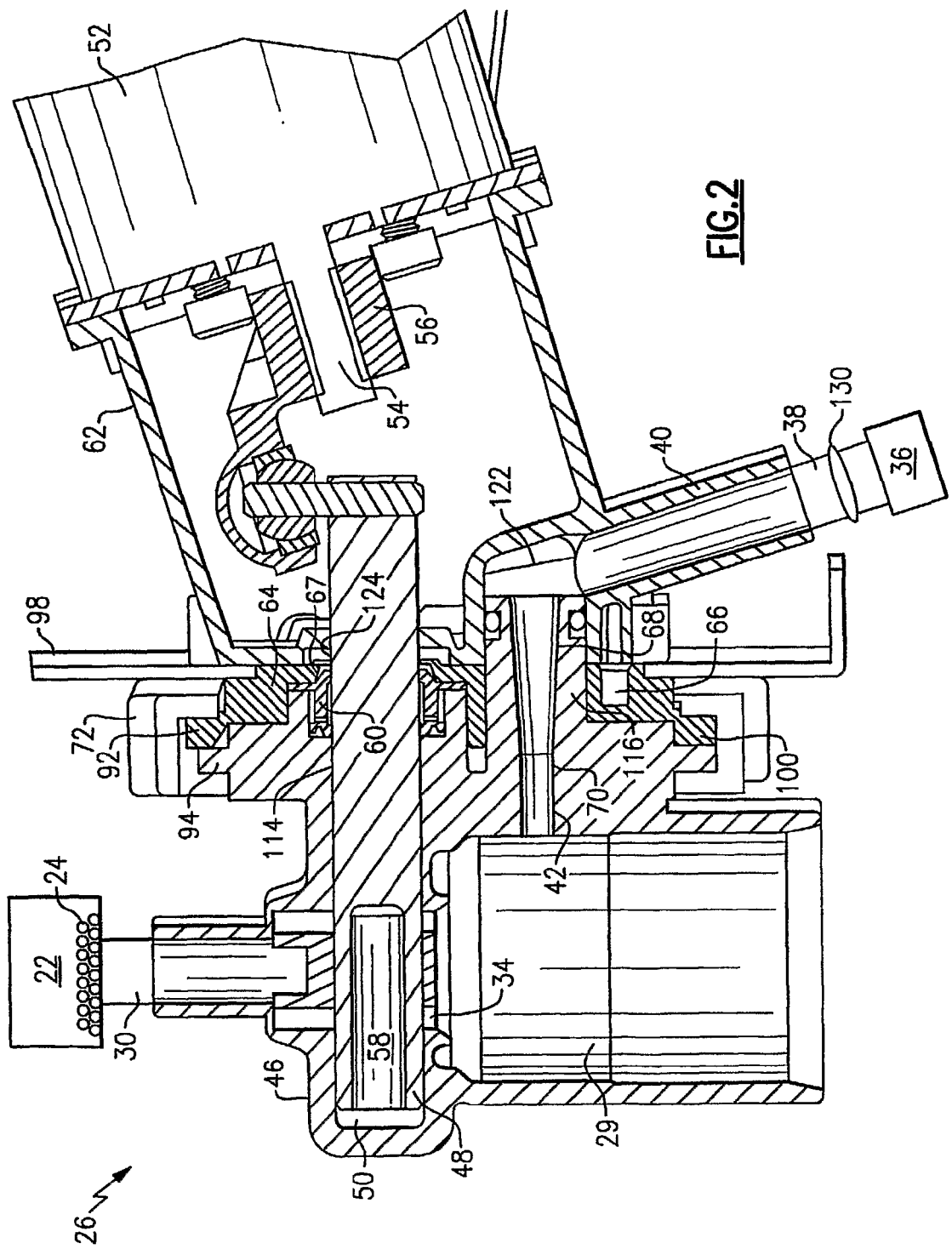
FIG. 2 schematically illustrates a cross-sectional view of a pump of the beverage system.

FIG. 2 schematically illustrates the pump 26 including a pump head 46. The flavored concentrate 24 in the concentrate container 22 flows along the conduit 30 and enters the pump head 46 through the concentrate inlet 32. A portion of a piston 48 received in a compartment 50 of the pump head 46 is substantially cylindrical in shape and includes an irregular surface 58. In one example, the irregular surface 58 can be a flattened surface or a substantially u-shaped depression. A cavity is defined between the irregular surface 58 of the piston 48 and the walls of the compartment 50. The compartment 50 has a fixed volume and does not expand or contract during operation of the pump 26. In one example, the piston 48 is made of stainless steel, and the compartment 50 is made of steel. The piston 48 controls the flow of the flavored concentrate 24 from the concentrate container 22 and into the mixing chamber 28 (shown in FIG. 3) that is housed in a mixing chamber housing 29. The pump 26 is described in U.S. patent application Ser. No. 10/955,175 filed Sep. 30, 2004 and entitled POSITIVE DISPLACEMENT PUMP, herein incorporated entirely by reference. As can be appreciated, the water outlet 42 is downstream of the pump compartment 50.

The pump 26 includes a motor 52 that drives a motor shaft 54. The motor 52 moves the piston 48 to draw the flavored concentrate 24 into the cavity through the concentrate inlet 32 and to release the flavored concentrate 24 from the cavity through the concentrate outlet 34. The concentrate outlet 34 functions as a top portion of the mixing chamber 28. The motor shaft 54 includes a hub assembly 56. The hub assembly 56 is a plastic molded part that holds brass components that allow for free rotation within the degrees of the pump 26 operation. As the motor shaft 54 rotates, the hub assembly 56 also rotates. Engagement of the hub assembly 56 with the piston 48 causes the piston 48 to both move linearly and to rotate. That is, the piston 48 nutates.

Figure 4:
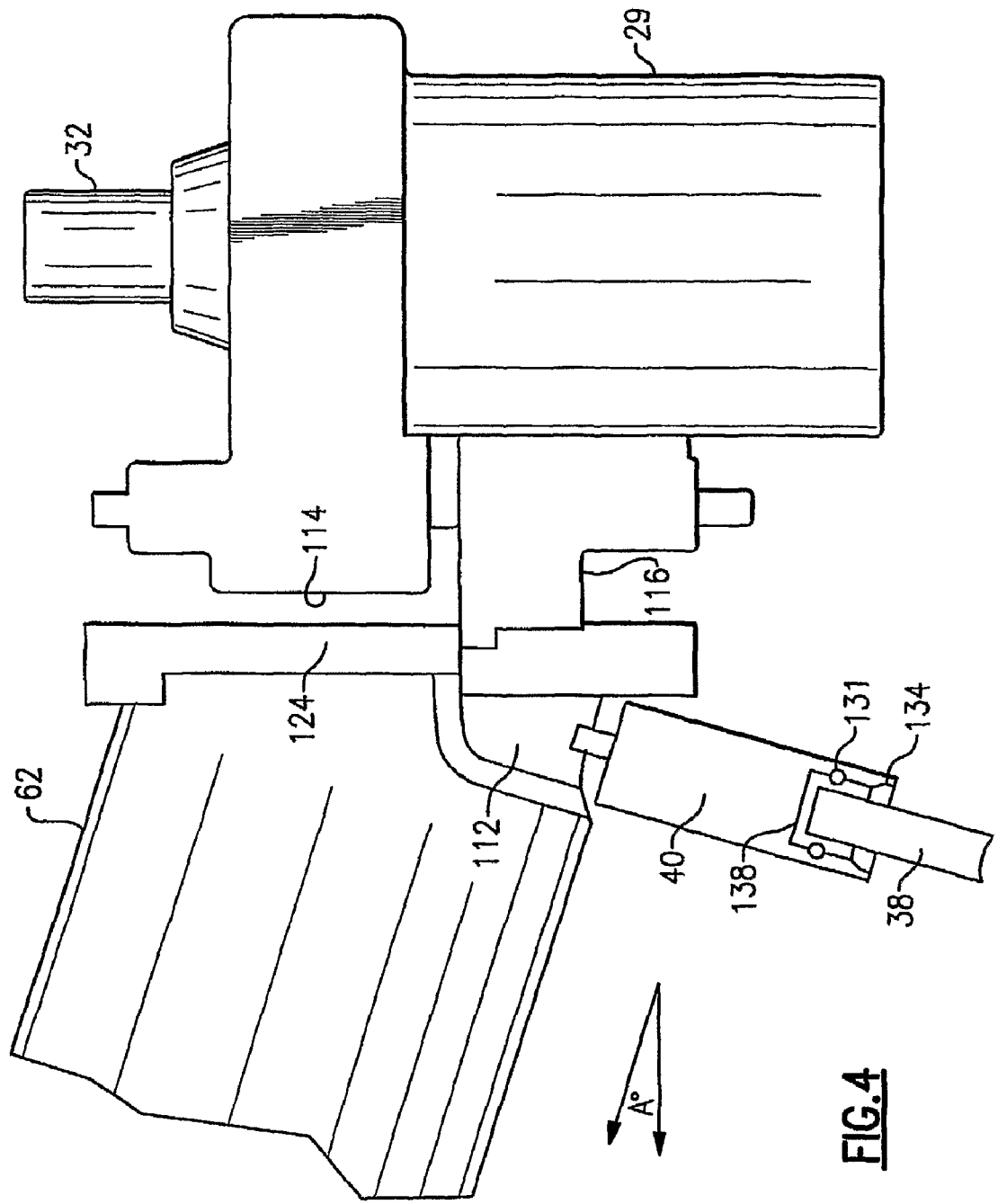
FIG. 4 schematically illustrates a side view of a pump head and a housing of the pump.
Figure 5:
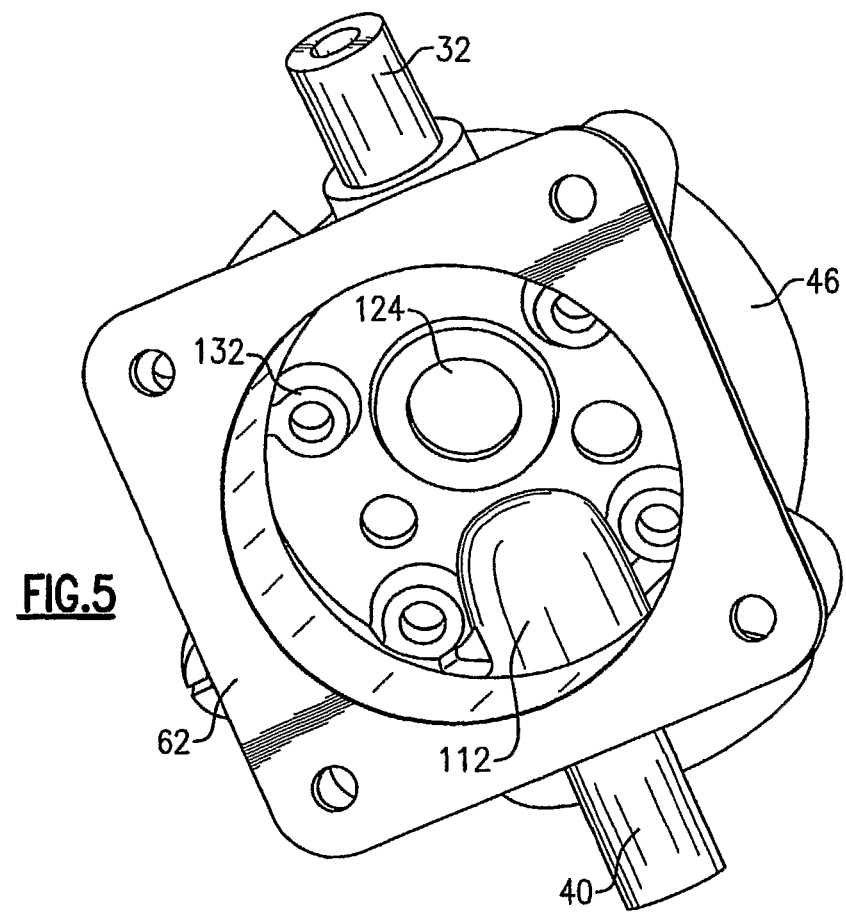
FIG. 5 schematically illustrates a front view of the pump head and the housing.

As shown in FIGS. 4 and 5, a housing 62 aligns the motor 52 and the motor shaft 54 and mounts the motor 52 to an assembly panel 98. The housing 62 includes a water port 40 that provides a path for the water from the water source 36 to flow into a water chamber 112, through a water port 116 of a pump head 46, along a water flow path 70 and into the mixing chamber 28 to form the beverage. The water port 40 is integrated with the housing 62 in one piece.

The motor 52 is angled relative to the housing 62 at an angle A. The angle A affects the volume of flavored concentrate 24 that is dispensed by the pump 26. The greater the angle A, the less flavored concentrate 24 is dispensed in a single revaluation of the piston 48. The smaller the angle A, the more flavored concentrate 24 is dispensed in a single revaluation of the piston 48. Preferably, angle A is approximately 16 to 18°. By employing this angle A, approximately ⅓₂ of an ounce of flavored concentrate 24 is dispensed with each revaluation of the piston 48.

A portion of the water port 116 of the pump head 46 is received in the water chamber 112 of the housing 62, providing a fluid path. The housing 62 includes a piston opening 124 that receives a portion of the piston 48. The housing 62 also includes a plurality of protrusion or recesses 132 that surround the piston opening 124. The housing 62 is made of plastic.

Figure 7:
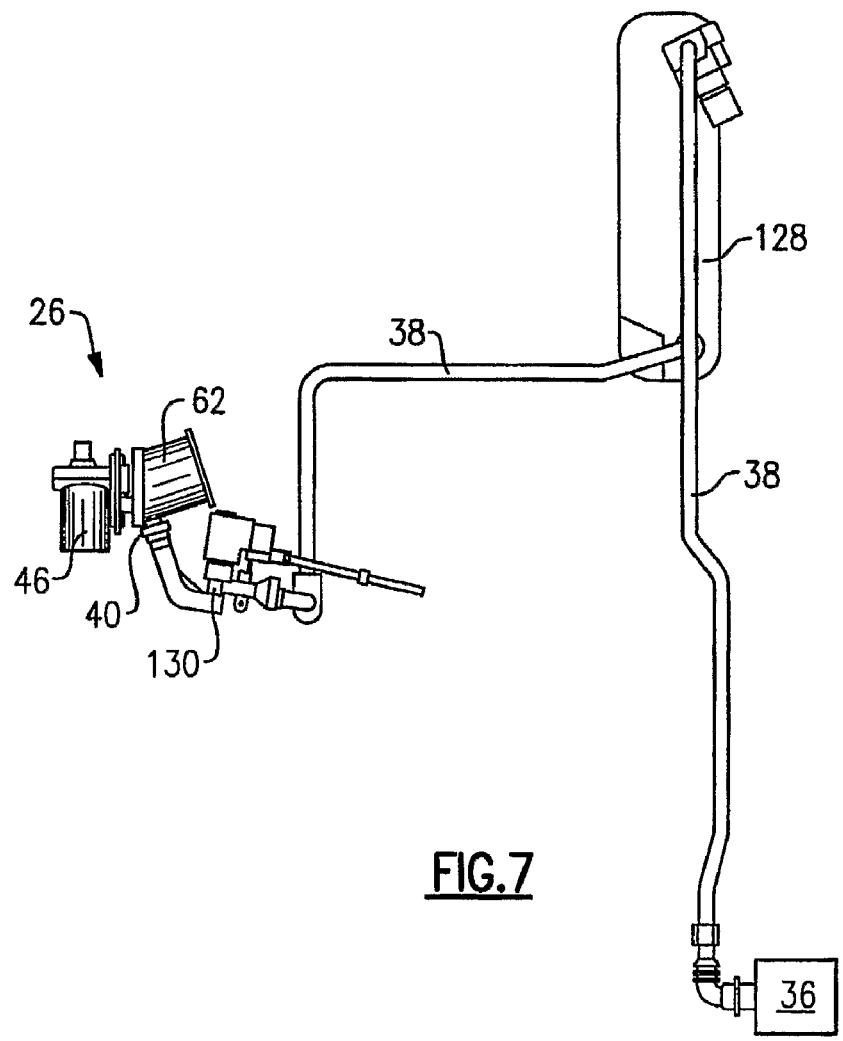
FIG. 7 schematically illustrates a view of the water supply system.

FIG. 7 shows the flow path of the water from the water source 36 to the pump 26. The water flow from the water source 36 flows along the conduit 38. The water is then chilled in an evaporator 128 of a refrigeration system (not shown). The chilled water then continues to flow along water the conduit 38. A valve 130 controls the flow of the chilled water along the conduit 38 and into the pump 26. The conduit 38 is removably connected to the water port 40. An end of the conduit 38 includes a fitting 136 with an o-ring 131 around the fitting 136. The fitting 136 of the conduit 30 is inserted in the water port 40. The o-ring 131 provides a seal between the fitting 136 and the water port 40. A securing feature 138 secures the fitting 136 to the water port 40. The securing feature 138 can be a clip, a pin or a threaded fastener.

Figure 6:
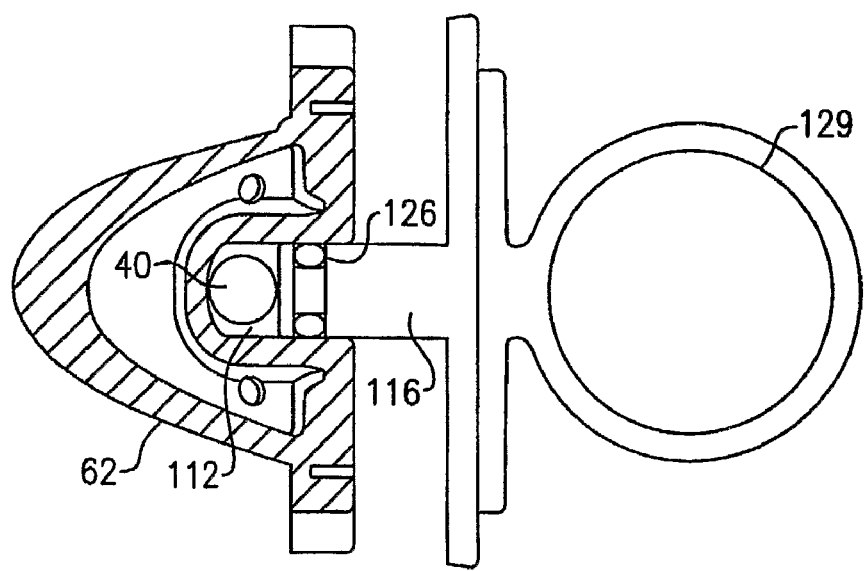
FIG. 6 schematically illustrates a top view of the pump head and the housing.

The chilled water then enters the water port 40 of the housing 62 and flows into the water port 116 of the pump head 46. The water flows along the water flow path 70, and a predetermined amount of water flows into the mixing chamber 28 to form the predetermined concentration of beverage. As shown in FIG. 6, an o-ring 126 surrounds the water port 116 to provide a seal to prevent leakage of water. The conduit 38 is directly connected to the water port 40, and therefore external connection are not needed. An exiting mating feature on the pump head 46 and the housing 62 can be used to form the water port 40.

A piston seal 60 provides a seal between the piston 48 and the pump head 46 and provides a wiping action as the piston 48 moves in the pump head 46. The piston seal 60 is made from an elastomeric material and overmolded onto a steel backing ring. A backing seal 66 provides a barrier between a wetted portion of the pump head 46 and the water port 40 of the housing 62 to prevent accidental spillage or splashing of the flavored concentrate 24 or a cleaning solution from entering the hub assembly 56.

Figure 8:
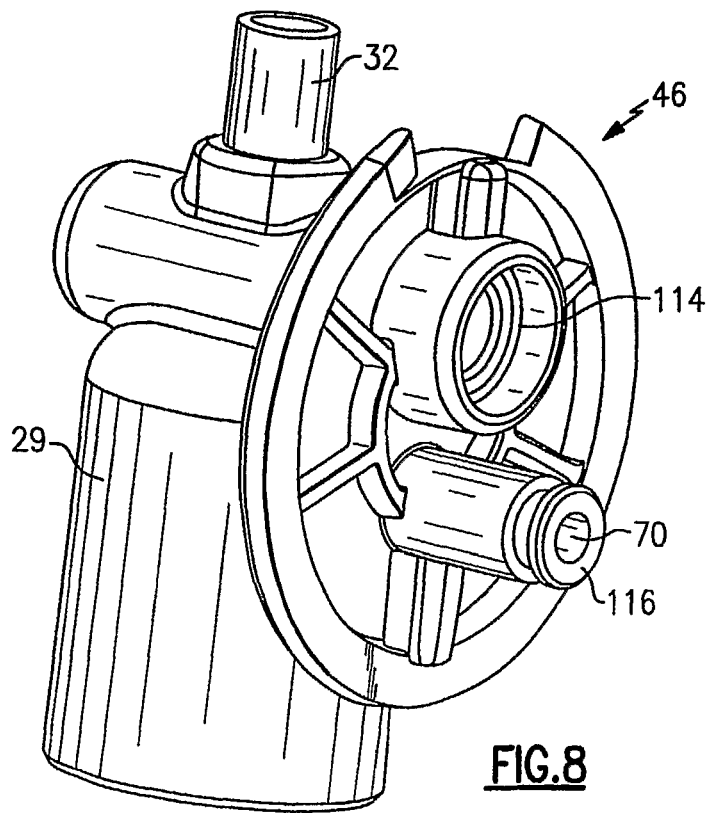
FIG. 8 schematically illustrates a perspective view of the pump head.

FIG. 8 illustrates the pump head 46. The pump head 46 includes a circumferential flange 94 that extends around the circumference of the pump head 46. The pump head 46 also includes a piston opening 114 that receives a portion of the piston 48 and the water port 116 that detects a portion of the water flow path 70.

Figure 9:
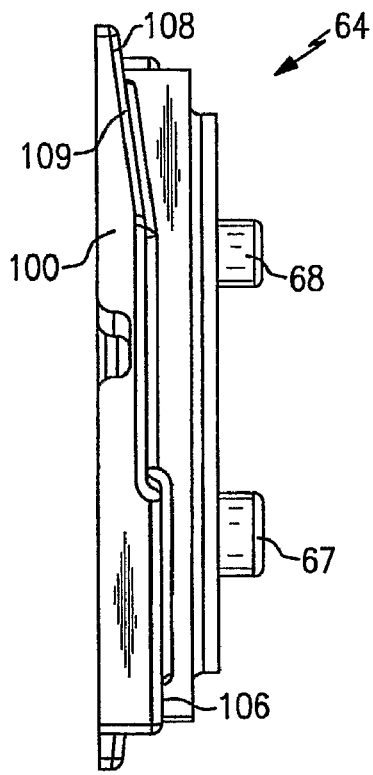
FIG. 9 schematically illustrates a perspective view of an adapter plate of the pump.
Figure 10:
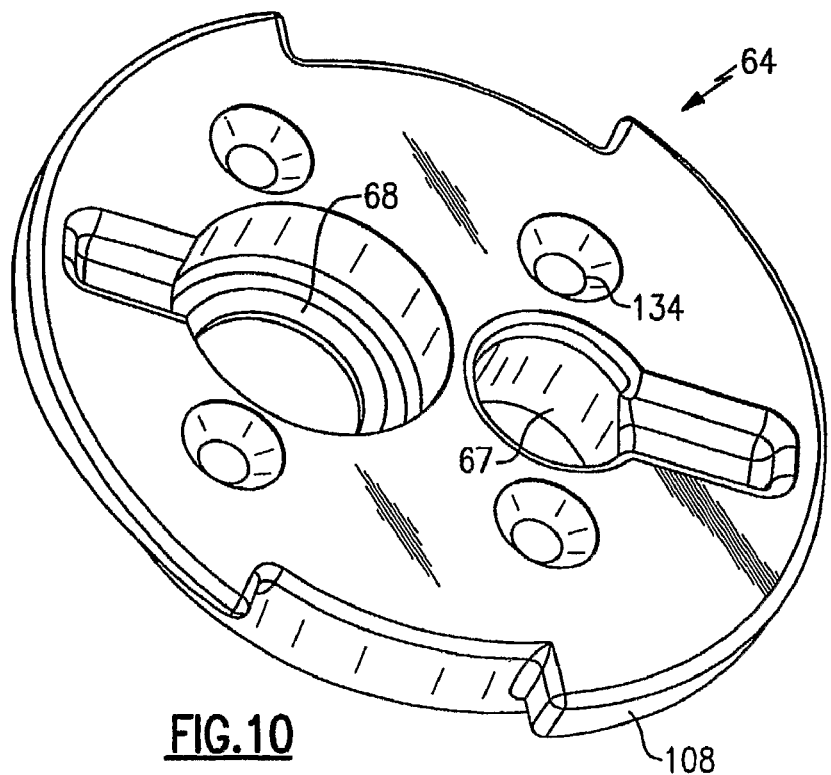
FIG. 10 schematically illustrates a side view of the adapter plate.

As shown in FIGS. 9 and 10, the pump 26 further includes an adapter plate 64 that maintains a geometric relationship between the piston 48 and the piston opening 124 of the housing 62 and minimizes movement of the piston 48. The adapter plate 64 includes a piston opening 67 that receives a portion of the piston 48 and a water opening 68 that receives the water port 116 of the pump head 46. The adapter plate 64 includes a circumferential flange 100. The circumferential flange 100 includes two opposing ramped portions each having a lower part 108, an inclined part 109 and a raised upper part 106. The adapter plate 64 also includes a corresponding another of a protrusion or recess 134 that surrounds the piston opening 67. When the adapter plate 64 is assembled in the pump 26, the protrusions or recesses 132 align with the another of the protrusion or a recess 134 to align the adapter plate 64 and the housing 62.

Figure 11:
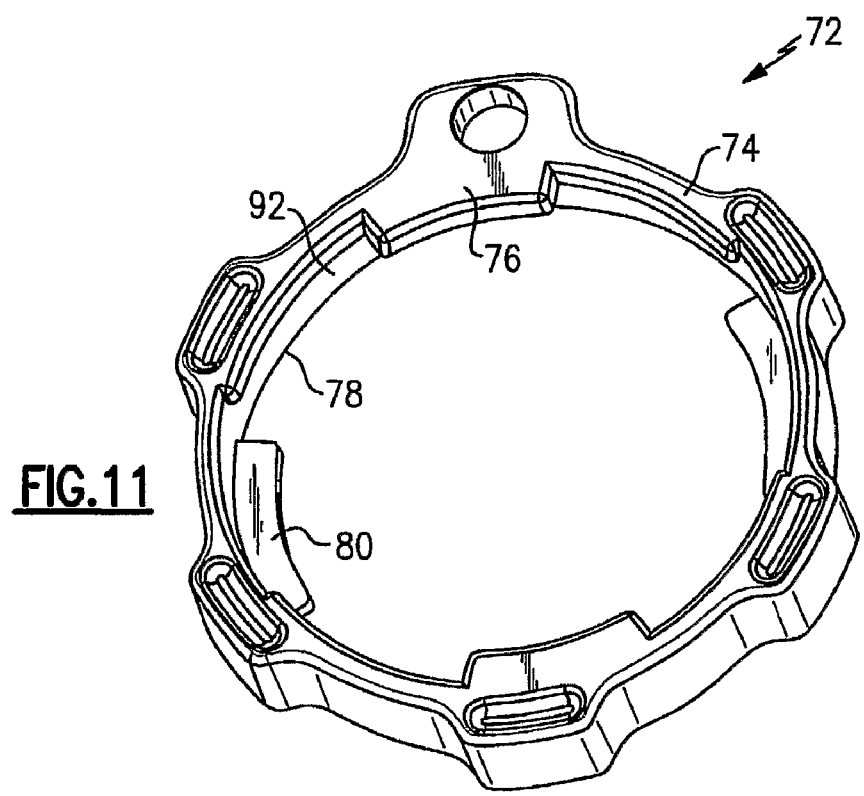
FIG. 11 schematically illustrates a perspective view of a locking ring of the pump.
Figure 12:
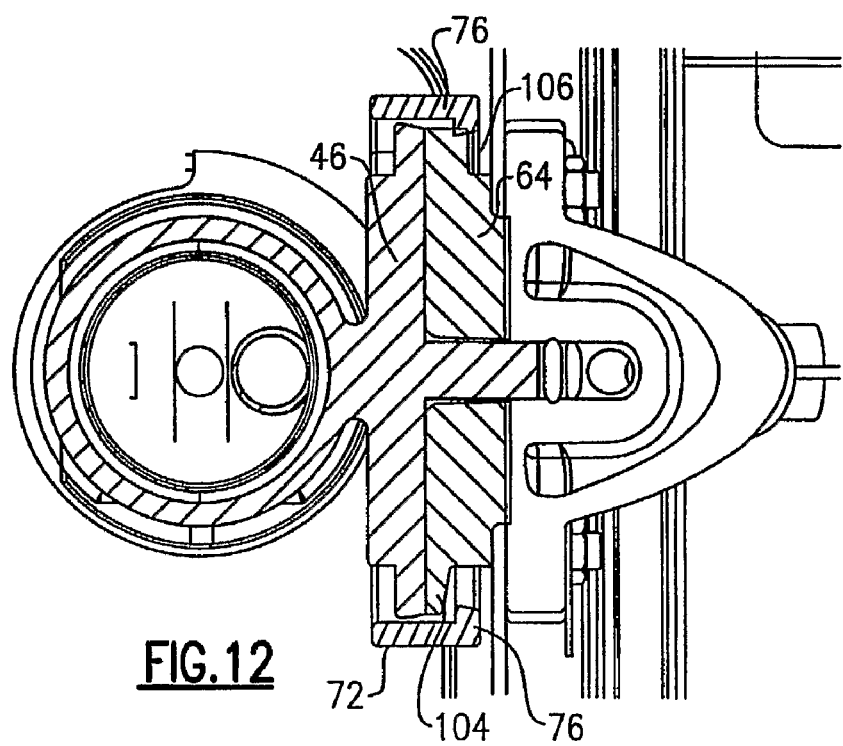
FIG. 12 schematically illustrates a top view of the pump.

As shown in FIG. 11, a locking ring 72 attaches the adapter plate 64 to the pump head 46, creating a geometric lock between the pump head 46 and the adapter plate 64. The locking ring 72 secures the pump head 46 to the adapter plate 64 to prevent leakage of the flavored concentrate 24 and the water from the pump head 46 and prevent inaccuracy. The locking ring 72 is substantially circular in shape and is made of plastic. The locking ring 72 includes a first side 74 with a plurality of first inward tabs 76 and an opposing second side 78 with a plurality of second inward tabs 80. In one example, the first side 74 includes two first inward tabs 76, and the second side 78 includes two second inward tabs 80. A gap 92 is defined between the inward tabs 76 and 80. Outward fingers 82 extend from the locking ring 72 to provide a surface for the operator to grab when rotating the locking ring 72.

The locking ring 72 and the pump head 46 are provided as a subassembly. The locking ring 72 is forced onto the pump head 46 such that the circumferential flange 94 of the pump head 46 is received in the gap 92 of the locking ring 72. The locking ring 72 freely rotates relative to the pump head 46.

When the components are installed, the circumferential flange 100 of the adapter plate 64 is positioned to be received in the gap 92 of the locking ring 72. That is, both the circumferential flange 100 of the adapter plate 64 and the circumferential flange 94 of the pump head 46 are received in the gap 92. The first inward tabs 76 of the locking ring 72 engage the adapter plate 64, and the second inward tabs 80 of the locking ring 72 engage the pump head 46. The locking ring 72 is rotated relative to the pump head 46 in a first direction until each of the first inward tabs 76 engage one of the raised upper parts 106 of the adapter plate 64 to wedge the locking ring 72 in the locked position and to attach the adapter plate 64 to the pump head 46, as shown in FIG. 9. The engagement of the locking ring 72 and the raised upper part 106 of the adapter plate 64 prevents the locking ring 72 from further rotation, and the locking ring 72 is then stopped in a locked position.

Although a beverage system 20 is illustrated and described, it is to be understood that the pump 26 of the present invention can be used in other systems. For example, the pump 26 can be used in a soft drink system. In this example, the pump 26 pumps flavored syrup which is mixed with carbonated water to make a soft drink. Alternately, the pump 26 pumps flavored syrup which is mixed with a frozen substance to create a frozen dessert.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A pump comprising:
a motor;
a piston moveable by the motor, said piston being moveable within a fixed volume compartment, such that said piston draws a precise amount of a concentrate into said compartment, and moves the concentrate through an outlet;
a housing that mounts the motor and receives the piston, wherein the housing includes an integral housing water port; and
a valve that controls a flow of water into the housing.

2. The pump as recited in claim 1 further including a water source and a water line, wherein the water line provides water from the water source and into the integral housing water port.

3. The pump as recited in claim 2 further including an evaporator that cools the water in the water line.

4. A pump comprising:
a motor;
a piston moveable by the motor, said piston being moveable within a fixed volume compartment, such that said piston draws a precise amount of a concentrate into said compartment, and moves the concentrate through an outlet;
a housing that mounts the motor and receives the piston, wherein the housing includes an integral housing water port; and
a water source and a water line, wherein the water line provides water from the water source and into the integral housing water port, wherein the water line includes a fitting, and the fitting is received in the integral housing water port.

5. The pump as recited in claim 1 wherein the housing includes a housing piston opening that receives the piston.

6. The pump as recited in claim 1 further including a pump head including a pump head piston opening that receives the piston and a pump head water port through which water flows and an adapter plate including an adapter plate piston opening through which the piston is received and a water opening that receives the pump head water port.

7. A pump comprising:
a motor;
a piston moveable by the motor;
a housing that mounts the motor and receives the piston, wherein the housing includes an integral housing water port;
a pump head including a pump head piston opening that receives the piston and a pump head water port through which water flows and an adapter plate including an adapter plate piston opening through which the piston is received and a water opening that receives the pump head water port; and
a locking ring that secures the adapter plate to the pump head.

8. A pump comprising:
a motor;
a piston moveable by the motor, said piston being moveable within a fixed volume compartment, such that said piston draws a precise amount of a concentrate into said compartment, and moves the concentrate through an outlet;
a housing that mounts the motor and receives the piston, wherein the housing includes an integral housing water port; and
a pump head including a pump head piston opening that receives the piston and a pump head water port through which water flows and an adapter plate including an adapter plate piston opening through which the piston is received and a water opening that receives the pump head water port, wherein the integral housing water port is in fluid communication with the pump head water port.

9. A pump comprising:
a motor;
a piston moveable by the motor, said piston being moveable within a fixed volume compartment, such that said piston draws a precise amount of a concentrate into said compartment, and moves the concentrate through an outlet;
a housing that mounts the motor and receives the piston, wherein the housing includes an integral housing water port; and
a mixing chamber, wherein the piston moves to drive a concentrate into the mixing chamber to combine with water drawn into the mixing chamber through the integral housing water port to form a beverage in the mixing chamber.

10. The pump as recited in claim 1 wherein an angle is defined between the motor and the housing, and the angle is approximately 16 to 18°.

11. A pump comprising:
a motor;
a piston moveable by the motor, said piston being moveable within a fixed volume compartment, such that said piston draws a precise amount of a concentrate into said compartment, and moves the concentrate through an outlet to draw a concentrate into a mixing chamber;
a housing that mounts the motor, wherein the housing includes an integral housing water port and a piston opening that receives the piston;
a water line including a fitting that is received in the integral housing water port;

a pump head including a pump head piston opening that receives the piston and a pump head water port in fluid communication with the integral housing water port;

an adapter plate including an adapter plate piston opening that receives the piston and a water opening that receives the pump head water port of the pump head;

the mixing container, wherein water from a water source is drawn along the water line and into the mixing container to mix with the concentrate to form a beverage; and a valve that controls a flow of water into the housing.

12. The pump as recited in claim 11 wherein the housing attaches the motor to an assembly panel.

13. A pump comprising:

a motor;

a piston moveable by the motor, said piston being moveable within a fixed volume compartment, such that said piston draws a precise amount of a concentrate into said compartment, and moves the concentrate through an outlet to draw a concentrate into a mixing chamber;

a housing that mounts the motor, wherein the housing includes an integral housing water port and a piston opening that receives the piston;

a water line including a fitting that is received in the integral housing water port;

a pump head including a pump head piston opening that receives the piston and a pump head water port in fluid communication with the integral housing water port;

an adapter plate including an adapter plate piston opening that receives the piston and a water opening that receives the pump head water port of the pump head;

the mixing container, wherein water from a water source is drawn along the water line and into the mixing container to mix with the concentrate to form a beverage; and an evaporator that cools the water in the water line.

14. A pump comprising:

a motor;

a piston moveable by the motor to draw a concentrate into a mixing chamber;

a housing that mounts the motor, wherein the housing includes an integral housing water port and a piston opening that receives the piston;

a water line including a fitting that is received in the integral housing water port;

a pump head including a pump head piston opening that receives the piston and a pump head water port in fluid communication with the integral housing water port;

an adapter plate including an adapter plate piston opening that receives the piston and a water opening that receives the pump head water port of the pump head;

the mixing container, wherein water from a water source is drawn along the water line and into the mixing container to mix with the concentrate to form a beverage; and a locking ring that secures the adapter plate to the pump head.

15. The pump as recited in claim 1, wherein said integral housing water port is positioned downstream of said pump compartment.

16. The pump as recited in claim 4, wherein said integral housing water port is positioned downstream of said pump compartment.

17. The pump as recited in claim 9, wherein said integral housing water port is positioned downstream of said pump compartment.

18. The pump as recited in claim 11, wherein said integral housing water port is positioned downstream of said pump compartment.

19. The pump as recited in claim 13, wherein said integral housing water port is positioned downstream of said pump compartment.

* * * * *